Oct. 24, 1944.    R. S. GRISWOLD    2,360,871
CASSETTE
Filed June 29, 1943    2 Sheets-Sheet 1
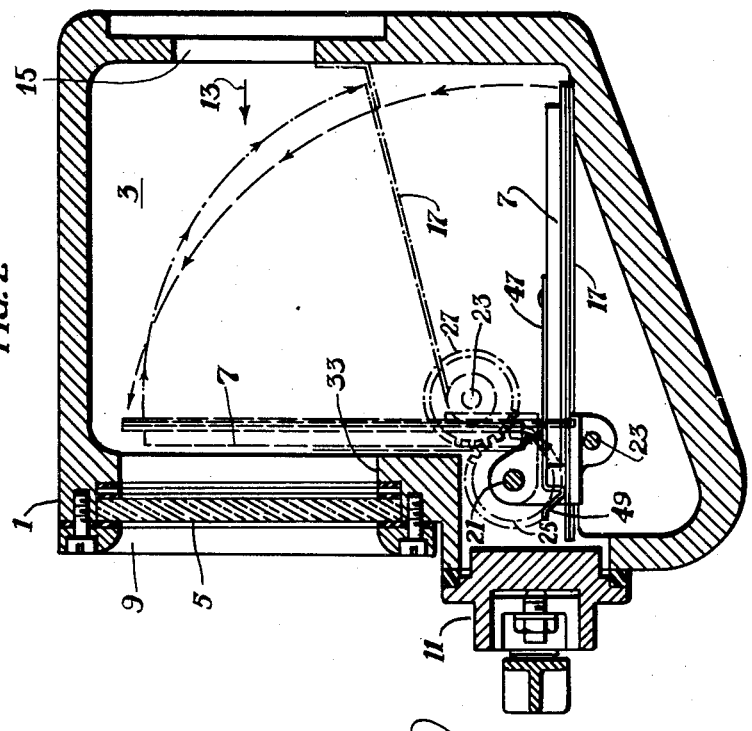
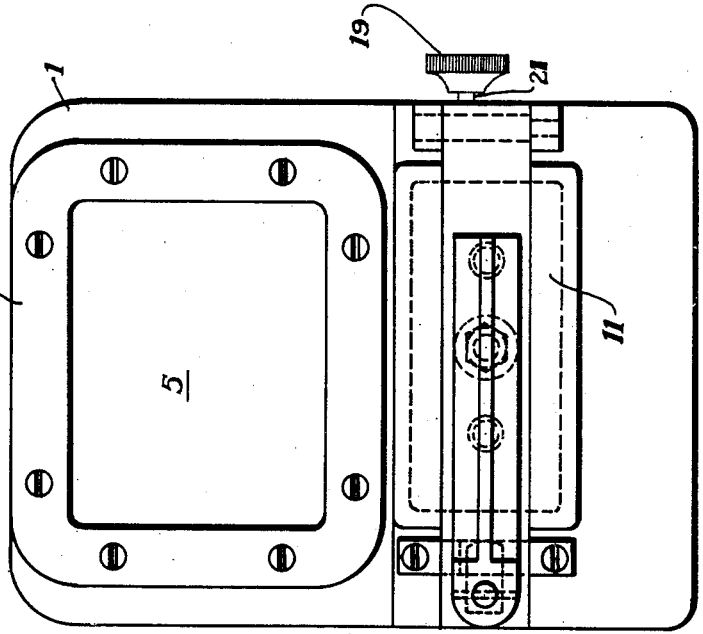
Inventor
Robert S. Griswold
By
C. D. Nuska
Attorney Oct. 24, 1944.  R. S. GRISWOLD  2,360,871
CASSETTE
Filed June 29, 1943  2 Sheets-Sheet 2
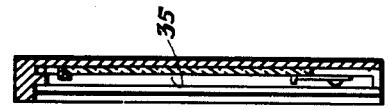
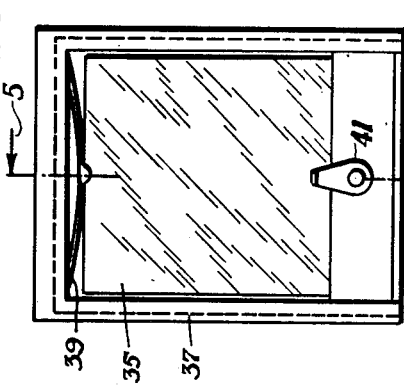
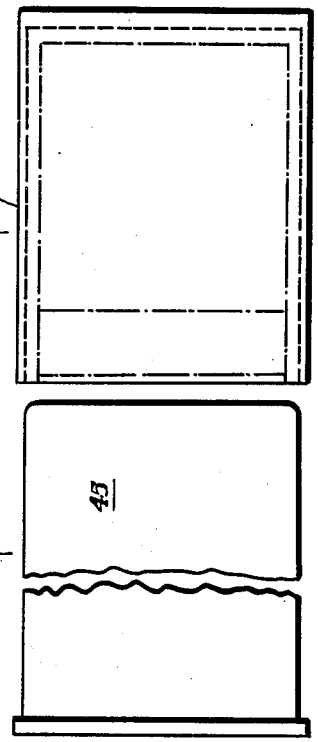
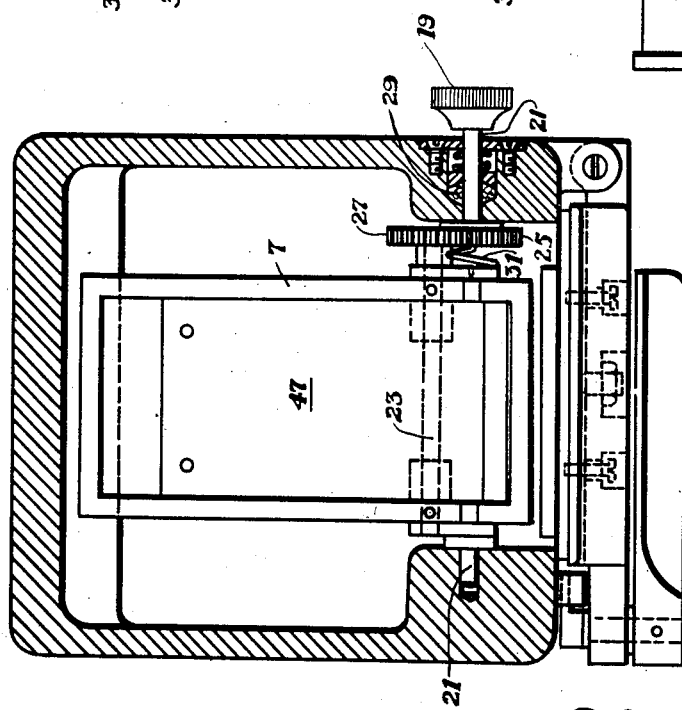
Inventor
Robert S. Griswold
By
Attorney Patented Oct. 24, 1944

2,360,871

UNITED STATES PATENT OFFICE 2,360,871

CASSETTE

Robert S. Griswold, Merchantville, N. J., assignor to Radio Corporation of America, a corporation of Delaware Application June 29, 1943, Serial No. 492,694

4 Claims. (Cl. 250—68)

This invention relates to improvements in photographic plate or film holders and has for its principal object to provide an improved cassette and one adapted for use within the viewing chamber of an electron-microscope, telescope, diffraction camera, or other "viewing device" having an "optical" or an "electron-optical" axis.

Another and specific object of the invention is to provide an improved cassette which may be loaded from the exterior of a viewing chamber or the like simply by inserting the photographic plate or film therein, and without removing any part of its actuating mechanism.

Another and important object of the invention is to provide an improved cassette which may be moved easily and quickly into the path of an electron beam or the like, as by a simple rotary force, and one which operates, as by the continued application of such a force, to expose the photographic plate or film therein to the impress of said beam.

Other objects and advantages together with certain preferred details of construction will be apparent and the invention itself will be best understood by a reference to the following specification and to the accompanying drawings, wherein Fig. 1 is a front elevational view of the viewing chamber of an electron microscope having a transmission type viewing screen and provided with a vacuumtight door through which access may be had to the interior of said chamber, Fig. 2 is a vertical section of the viewing chamber of Fig. 1 showing a cassette constructed in accordance with the principle of the present invention, the direction and movement of the several parts of the cassette being indicated by broken arrows, Fig. 3 is a transverse sectional view of the apparatus of Figs. 1 and 2 showing the cassette in its horizontal or idle position, Fig. 4 is an elevational view showing a frame for the photographic plate or film removed from the cassette, Fig. 5 is a sectional view taken on the line 5—5 of Fig. 4, Fig. 6 is an elevational view of the "bottom" edge of the frame of Figs. 4 and 5, and Fig. 7 is an exploded view showing the frame and the mask for the photographic plate therein, removed from the frame.

In the accompanying drawings, wherein like reference characters represent the same parts in all figures, I designates, generally, an electron-microscope or analogous electron-image device having an evacuable viewing chamber 3 provided with a fluorescent screen or window 5 and which contains a cassette 7 constructed and operated in accordance with the principle of the present invention. As shown in Figs. 1 and 2, the fluorescent window 5 is mounted in a suitable escutcheon 9 at the front of the viewing chamber and there is an air-tight door 11 beneath the escutcheon through which access may be had to the interior of the said chamber for the purpose of loading the cassette 7 with the photographic film or plate assembly shown in Figs. 4 to 7, inclusive.

As indicated by the straight arrow 13 (Fig. 2), the electron-image beam enters the viewing chamber through an aperture 15 which surrounds the "optical axis" of the device and which will be understood to communicate with the "main" or lens chamber (not shown) of the microscope. This aperture 15, at the rear of the viewing chamber 1, is in register with the center of the translucent fluorescent screen 5. Hence, when the image is to be viewed directly, the beam 13 impinges the rear surface of the said screen and forms a light image thereon which is visible to an observer looking into the screen at the front of the chamber.

As will hereinafter more fully appear, the cassette of the invention is pivotally mounted so that when the image is to be viewed directly (i. e. on the fluorescent screen 5) the cassette 7 may be swung "downwardly" out of the way of the screen and, when the image is to be photographed, swung upwardly into the path of the electron image beam 13. As shown in Fig. 2, the cassette 7 is provided with shutter 17 and an important feature of the invention resides in the provision of a single control for both (a) moving the cassette 7 into the path of the electron-image and (b) operating its shutter 17 to expose the photographic plate or film therein to said image.

Referring now particularly to Figs. 2 and 3 wherein it will be seen that the viewing chamber contains two rotatable shafts 21 and 23, respectively, which extend along parallel axes across the viewing chamber 3 in the space beneath the fluorescent screen 5. Shaft 21 has a "driving" gear 25 thereon and shaft 23 is provided with a driven gear 27 which meshes with gear 25. The driving shaft 21 extends through an air-tight bushing 29 to the exterior of the viewing chamber and has the control knob 19 fixed to its outer end. The cassette 7 is mounted on the driving shaft 21 but is not rigidly secured thereto; that is to say, it is mounted to permit of its being rotated (i. e. pivoted) on and with respect to said shaft. There is, however, a helical spring 31 wrapped about the shaft 21 and secured, at one end, to the side surface of the gear 21 and, at its opposite end, to the adjacent side edge of the cassette 7 and this spring 31 is sufficiently rigid to prevent relative rotary movement between the shaft 21 and the cassette 7 when the knob 19 is turned through an arc of, say, 90°. Thus, when the knob 19 is turned, counter-clockwise, the torque applied to the driving shaft 21 is transmitted through the gear 25 and spring 31 to the cassette 7 and, as a result, the cassette swings upwardly from its idle position (shown in solid lines in Fig. 2) to a position whereat the shutter 17 on the "rear" surface of the cassette is directly in the path of the electron-image beam 13.

The driven shaft 23 extends across, and is supported for rotation upon, the cassette 7 adjacent to the lower edge thereof. The shutter 17 of the cassette is fixed on the driven shaft 23 and is biased to its closed position (against the rear surface of the cassette) by the spring 31 which transmits its force in the proper direction through the driving gear 25 (to which the spring 31 is anchored), driven gear 27 (which is in mesh with gear 25), and the shaft 23 (on which gear 27 is fixed) to the shutter (which is fixed on the said shaft 23). Since the driven shaft 23 is supported on the cassette 7 it will move with the cassette. That is to say, the driven shaft 23 will move around the axis of the driving shaft 21 when the knob 19 on the driving shaft 21 is turned through an arc of 90° to raise the cassette to its operating position. Such movement is indicated in Fig. 2 wherein the driven shaft 23 is shown in solid lines which illustrate its position when the cassette is "down," and in broken lines which show the position of shaft 23 after it has been moved around the axis of the driving shaft 21 in raising the cassette to its operating position.

The upward movement of the cassette 7 is halted by a suitable stop, the example the abutment 33 at the rear of the fluorescent screen 5. Thereafter, additional torque applied to the driving shaft 21 by continuing to turn the knob 19, counterclockwise, is translated by the driving and driven gears 25 and 27 into a clockwise movement of the driven shaft 23. Since the shutter 17 of the cassette is fixed on the driven shaft 23 such clockwise movement serves to open the shutter, against the force of its bias, thereby exposing the photographic plate 35 (Fig. 4) within the cassette to the action of the electron-image beam 13. When the plate 35 has been exposed to the beam for a suitable length of time the knob 19 is released and the spring 31 operates to restore the shutter to its normally closed position. Thereafter, the knob 19 may be turned in the clockwise direction to "lower" the cassette 7 to the idle position shown in solid lines in Fig. 2.

As shown in Fig. 4, the photographic film or plate 35 is supported in a suitable frame 37 and is removably located therein as by a bowed spring 39 and a latch 41. The frame is provided with a slot 43 at its "lower" end (as shown in Fig. 6) for receiving a thin metal mask 45 (Fig. 7) which serves to shield the photographic plate 35 from exposure to light during the loading operation.

The cassette is provided with a hinged or a flexible-metal cover 47 which extends around that (lower) end of the cassette which is presented to the door 11 when the cassette is in the position shown in solid lines in Fig. 2. Thus, the frame 37 which contains the photographic plate 35 and the mask 45, may be inserted into the cassette simply by raising the free end 49 of the cover 47 and sliding the frame therein. The mask 45 is preferably longer than the frame 37 so that it projects from the cassette a distance sufficient to prevent the door 11 in the viewing chamber 3 from being closed while the mask remains in the frame.

From the foregoing, it will be apparent that the present invention provides a reliable and trouble-free cassette which is suitable for use in an electron-image device, and one characterized by its ease of operation and by the simplicity and economy of its parts. It will also be apparent that the invention is susceptible of various other applications and modifications. Accordingly, it is to be understood that the foregoing description of a preferred embodiment of the invention is to be interpreted as illustrative and not in a limiting sense except as required by the prior art and by the spirit of the appended claims.

What is claimed is:

1. In an electron image device having a viewing chamber having an electron-optical axis and including a translucent fluorescent window in a wall of said chamber mounted in a plane substantially normal to said electron-optical axis, a door in said wall, a rotatable shaft within said chamber having an axis of rotation which lies adjacent to said door and off-set from said electron-optical axis, and a cassette mounted upon said shaft for movement about said axis of rotation into and out of a plane which is substantially normal to said electron-optical axis, said cassette being provided with an opening through which it may be loaded and unloaded and which is accessible from said door when said cassette is moved to a position whereat it is out of said plane.

2. The invention as set forth in claim 1 and wherein said cassette is provided with a removable masking plate which projects from said opening a distance sufficient to prevent said door from being closed until said removable masking plate is removed.

3. In an electron-image device having a viewing chamber including a translucent screen mounted in a plane substantially normal to the path of said electron-image, a shaft supported for rotation within said chamber along an axis which is substantially parallel to and offset from said screen, a cassette mounted on said shaft and movable therewith, a movable shutter on the image side of said cassette, means normally biasing said shutter to its closed position, means exterior of said chamber for rotating said shaft whereby to move said cassette to a position whereat said normally closed shutter is in the path of said electron image, and means operable when said cassette is in said positon for opening said shutter against the force of its bias.

4. In an electron-image device having a viewing chamber including a translucent fluorescent screen mounted in a plane substantially normal to the path of said electron-image, a rotatable driving shaft, a cassette rotatably supported on and with respect to said driving shaft, a rotatable driven shaft supported on said cassette for movement about said first mentioned shaft, driving and driven gears mounted in operative relation on said shafts, a shutter for said cassette fixedly mounted on said driven shaft for movement therewith a spring fixed at one end to said driving gear and at its other end to said cassette, said spring being sufficiently rigid to prevent relative rotary movement between said driving shaft and said cassette when said driving shaft is rotated in the direction required to move said cassette into the path of said electron-image and being tensioned to transmit a force to said shutter through said gears and said driven shaft of an intensity and direction such that said shutter is normally biased to its closed position, means for applying torque to said driving shaft whereby to move said cassette and its closed shutter to a position whereat they are interposed in the path of said electron-image, and means for halting said movement when said cassette and its closed shutter have reached said position, whereby upon the application of additional torque to said last mentioned means said additional torque is translated by said driving and driven gears into a rotary movement of said driven shaft which serves to open said shutter against the force of its bias.

ROBERT S. GRISWOLD.